United States Patent Office 3,504,019
Patented Mar. 31, 1970

3,504,019
PROSTAGLANDIN PURIFICATION PROCESS
Milton Lapidus, Rosemont, Norman H. Grant, Wynnewood, and Harvey E. Alburn, West Chester, Pa., assignors to American Home Products Corporation, New York, N.Y., a corporation of Delaware
No Drawing. Filed Feb. 20, 1967, Ser. No. 617,061
Int. Cl. C07c 61/36
U.S. Cl. 260—514   13 Claims

ABSTRACT OF THE DISCLOSURE

Biologically active crude prostaglandins are isolated and purified by an improved process comprising dialyzing the prostaglandins through a semi-permeable membrane, leaving impurities behind. The process is applicable to prostaglandins isolated from animal materials and to those enzymatically biosynthesized from fatty acids. Prostaglandin $E_2$ is useful as a bronchodilator.

---

This invention relates to the purification of therapeutically useful substances. More particularly it provides an improved, convenient and economical means to obtain biologically active prostaglandins free of impurities and in a form especially suitable for reconstitution into parenteral dosage forms.

BACKGROUND OF THE INVENTION

Smooth muscle stimulating and blood pressure reducing activity was first demonstrated in extracts of human seminal plasma and vesicular glands of sheep by Goldblatt, Chem. Ind. (London), 52, 1056 (1933), and von Euler, Arch. Exptl. Pathol. Pharmakol., 175, 78 (1934). The active principle in the lipid-soluble, acidic fraction was named prostaglandin (PG). Later, two biologically active crystalline compounds, designated $PGE_1$ and $PGF_1$ were isolated from the acidic fraction by Bergstrom and Sjovall, Acta Chem. Scand., 11, 1086 (1957). Potent vasodepressor activity was found to be due to $PGE_1$, whereas both $PGE_1$ and $PGF_1$ stimulated smooth muscle. The structure of $PGE_1$ was established in 1962 by Bergstrom, Dressler, Ryhage, Samuelsson and Sjovall, Arkiv. Kemi., 19, 563. $PGE_1$ is 7[3-hydroxy-2-(3-hydroxy-1-octenyl)-5-oxocyclopentyl]heptanoic acid, a compound of Formula I:

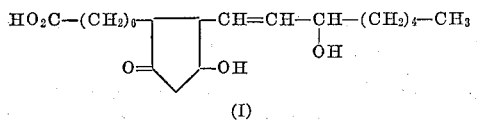

(I)

After the isolation of $PGE_2$, $PGE_3$ $PGF_2$ and $PGF_3$, it became apparent that prostaglandins are a family of closely related structures. More particularly, Bergstrom and Samuelsson, Ann. Rev. Biochem., 34, 101 (1965), have established that they are $C_{20}$-carboxylic acids containing a five membered ring; zero or one keto groups; two or three hydroxy groups; and one to three carbon to carbon double bonds. Prostaglandin E's (PGE's) have keto and hydroxy substituents in the ring; and prostaglindin F's (PGF's) have two hydroxy substituents. At the present state of the art, the naturally occurring prostaglandins have been converted by reaction with hydrogen and catalysts to derivatives wherein the carbon to carbon double bonds are saturated; they have been chemically reduced, for example, with sodium borohydride, to compounds in which keto groups are converted to hydroxy; they have been reacted with bases and carboxyl esterifying agents to form salts and esters; and they have been treated with acylating agents to prepare esters of the side chain and ring hydroxyl groups. All of these derivatives have the typical PG activity shown by the natural products.

The biologically-active prostaglandins with which this invention is concerned, therefore, are those of the formulae:

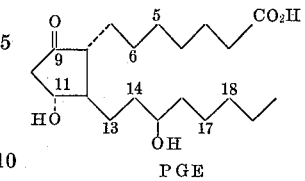
PGE

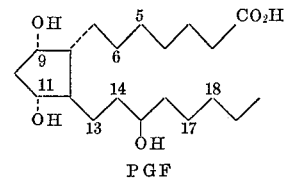
PGF wherein, in said formulae, the carbon-carbon bonds at $C_{13}-C_{14}$ are trans unsaturated; the carbon-carbon bonds at $C_5-C_6$ are saturated or cis unsaturated; and the carbon-carbon bonds at $C_{17}-C_{18}$ are saturated or cis unsaturated and hydrogenated, reduced keto, base addition salts, and esterified or alkanoylated derivatives thereof.

Biologically active prostaglandins have been isolated from fish meal and chicken offal, and from animal materials such as spinal cord, bone marrow, duodenum, kidney, liver, lungs, from sperm and prostate and the like, and from a variety of sources, for example, cattle, sheep and pigs. As will be obvious to those skilled in the art, it is difficult to obtain from these sources material free from antigens and pyrogens associated with tissue fragments or cell debris, lipids, foreign proteins and the like. As a result, a need exists to provide purified prostaglandins suitable for therapeutic use and especially for repeated parenteral administration.

Biologically active prostaglandins have also been prepared by biosynthesis, which provides products especially suitable for therapeutic use, but only, up to now, after difficult and time consuming isolation processes. Thus van Dorp, Beerthius, Nugteren and Vonkeman, Biochim. et Biophys. Acta, 90, 294 (1964) and Bergstrom, Danielsson, and Samuelsson, ibid., 90, 208 (1964) demonstrated that arachidonic acid is transformed into 7-[3-hydroxy-2 - (3 - hydroxy - 1 octenyl) - 5 - oxocyclopentyl] - 5-heptenoic acid ($PGE_2$) by enzyme-containing homogenates of sheep vesicular glands and Bergstrom, Danielsson, Klenberg and Samuelsson, J. Biol. Chem., 239, PC4006 (1964) showed that enzymes will convert homo-$\gamma$-linolenic acid into 7-[3-hydroxy-2-(3-hydroxy-1-octenyl)-5-oxocyclopentyl]-heptanoic acid ($PGE_1$) and eicosa-5,8,11,14,17-pentenoic acid into 7-[3-hydroxy-2-(3-hydroxy - 1,5-octadienyl) - 5 - oxocyclopentyl] - 5 - heptenoic acid ($PGE_3$). However, the enzymatic conversion of prostaglandin and the recovery of the prostaglandin by isolation from the enzyme system are not satisfactory either from the standpoint of overall yield, purity or recovery operations. Present recovery methods are based on solvent percipitation of impurities, differential extraction at various pH's with a variety of solvents, and chromatography. Generally speaking, the purification procedures are time consuming, costly of equipment and solvents, involve potential hazards in the use of large quantities of acetone, alcohol, ether and the like, and require burdensome manipulations such as precipitation, filtration, evaporation in vacuo, extraction and chromatography. It would be desirable to provide a much simplified method of isolating prostaglandin of high purity from enzymatic synthesis systems.

In is accordingly, a primary object of this invention to provide a means to obtain prostaglandins substantially free from impurities and suitable for therapeutic use. It is a further object to obtain therapeutically useful prostaglandins from naturally-occurring animal material. Still another object of this invention is to provide a means to obtain prostaglandins suitable for therapeutic use and substantially free from pyrogens and antigens associated with tissue fragments or cell debris, lipids, foreign protein and the like. Yet another object is to provide an improved means to isolate prostaglandins suitable for therapeutic use from enzymatic synthesis systems. Still a further object of this invention is to provide a means to biosynthesize prostaglandins in the presence of glutathione and to isolate them whereby there are obtained greater conversion and higher recoveries, based on the substrate, than heretofore possible.

These and other objects readily obvious to those skilled in the art are obtained by the means of this invention which is, in essence, a process for purifying a crude prostaglandin and rendering it suitable for therapeutic use comprising the steps of (a) Dialyzing an aqueous solution containing prostaglandin and impurities whereby the prostaglandin substantially free from impurities passes through a semi-permeable membrane into water;

(b) Adjusting the solution of prostaglandin in water to a pH of from about 1 to about 3.5, and preferably about 3;

(c) Extracting the prostaglandin from the said solution into an inert organic solvent; and (d) Evaporating the said solvent, leaving the prostaglandin as a residue substantially free of impurities.

Special mention is made of three especially valuable embodiments of the above process. These comprise isolating 7-[3-hydroxy-2-(3-hydroxy-1-octenyl)-5-oxocyclopentyl]-5-heptenoic acid; 7-[3-hydroxy-1,5-octadienyl)-5-oxocyclopentyl]-5-heptenoic acid; and 7-[3-hydroxy-2-(3-hydroxy-1-octenyl)-5-oxocyclopentyl]-heptanoic acid in a therapeutically useful form substantially free from impurities.

The instant invention also contemplates an embodiment of the above process wherein the said aqueous solution of step (a) is a mixture prepared by incubating a fatty acid in the presence of an enzyme until conversion of the said acid to a prostaglandin is substantially complete.

It is also contemplated as an embodiment to use a process wherein the said enzyme is derived from sheep seminal vesicular glands.

A further embodiment contemplated by the instant invention is to use a enzyme synthesis mixture wherein said incubation has been carried out in the presence of glutathione. Higher yields of prostaglandin, based on fatty acid substrate, are provided in this embodiment.

Although a number of lipid-solubilizing, substantially water immiscible solvents can be used in step (c) hereinabove, such as ethers, e.g., ethyl ether; ketones, e.g., methyl isobutyl ketone; halogenated hydrocarbons, e.g., chloroform, methylene chloride or ethylene dichloride or carbon tetrachloride; esters, e.g., ethyl acetate or amyl acetate and the like; it is preferred to use oxygenated or halogenated solvents such as ethyl ether or methylene chloride.

The instant invention contemplates in its embodiments also, the enzymatic conversion of arachidonic acid to 7 - [3 - hydroxy - 2 - (3 - hydroxy - 1 - octenyl) - 5 - oxocyclopentyl]-5-heptenoic acid; of eiscosa-5,8,11,14,17-pentaenoic acid to 7-[3-hydroxy-2-(3-hydroxy-1,5-octadienyl)-5-oxocyclopentyl]-5-heptenoic acid; and of homo-γ-linolenic acid to 7-[3-hydroxy-2-(3-hydroxy-1-octenyl)-5-oxocyclopentyl]-heptanoic acid, respectively, and their isolation substantially free from impurities by the improved dialysis process outlined hereinabove.

The key step (a) in the instant process is dialysis. Although this is a fairly common procedure to recover and purify proteins and other macromolecules in a condition free of small molecules, yet its usefulness to purify prostaglandins is unexpected and even astonishing. This is because high molecular weight lipids are rarely dialyzed. The use of dialysis to purify prostaglandins is a procedure that would not suggest itself to the average lipid chemist seeking to obtain therapeutically pure prostaglandins.

To carry out the instant process the aqueous solution containing prostaglandin and impurities is purified by dialysis through a cellulose membrane, or obvious equivalent thereof, against about 20 parts by weight of distilled water, based on the said aqueous solution. Since PG's are exceptionally sensitive to both low and high pH's, mild and gentle techniques compatible with their sensitive groups are used throughout. For example, it is preferred to dialyze at a neutral pH of about 7.5 and at low temperatures, and preferably between the freezing point of the solution and about 25° C., and especially at about 10° C. More product can be obtained by repeating the dialysis against about 15 parts of fresh distilled water.

The combined dialysates containing prostaglandin substantially free of impurities should then be adjusted to a pH of from about 1 to about 3.5. Dilute sulfuric acid or an obvious chemical equivalent thereof can be used to make the adjustment. Next the prostaglandin is extracted from the aqueous solution with an inert organic solvent. If ether is used, for example, good recoveries are obtained if three portions of ether, each about 1/10 of the volume of the dialyzate are used, then combined. The prostaglandin substantially free of impurities is isolated from the solvent extracts by evaporating the solvent, especially in a vacuum and preferably at low temperatures, e.g. about 0 to 10° C.

Among the therapeutically useful compounds prepared by the process of this invention is 7-[3-hydroxy-2(3-hydroxy-1-octenyl)-5-oxocyclopentyl]-5-heptenoic acid, also known as $PGE_2$. It has been found that administration of compositions comprising $PGE_2$ to guinea pigs provides relief from bronchial spasm.

Compositions of $PGE_2$ can be administered in a variety of dosage forms, the oral route being used primarily for maintenance thereapy while injectables tend to be more useful in acute emergency situations. Inhalation (aerosols and solution for nebulizers) seems to be somewhat faster acting than other oral forms but slower than injectables and this method combines the advantages of maintenance and moderately-acute stage therapy in one dosage unit.

The daily dose requirements vary with the particular composition being employed, the severity of the symptoms being presented, and the animal being treated.

For animal dosages, the $PGE_2$ medicament can be compounded into any of the usual oral dosage forms including tablets, capsules and liquid preparations such as elixirs and suspensions containing various coloring, flavoring, stabilizing and flavor masking substances. For compounding oral dosage forms the active ingredient can be diluted with various tableting materials such as starches of various types, calcium carbonate, lactose, sucrose and dicalcium phosphate to simplify the tableting and capsulating process. A minor proportion of magnesium stearate is useful as a lubricant.

For administration by the oral inhalation route with conventional nebulizers or by oxygen aerosolization it is convenient to provide the $PGE_2$ medicament in dilute aqueous solution, preferably at concentrations of about 1 part of medicament to from about 100 to 200 parts by weight of total solution. Entirely conventional additives may be employed to stabilize these solutions or to provide isotonic media, for example, sodium chloride, sodium citrate, citric acid, sodium bisulfite, and the like can be employed.

For administration as a self-propelled dosage unit for administering the medicament in aerosol form suitable for inhalation therapy the composition can comprise the medicament suspended in an inert propellant (such as a mixture of dichlorodifluoromethane and dichlorotetrafluoroethane) together with a co-solvent, such as ethanol, flavoring materials and stabilizers. Instead of a co-solvent there can also be used a dispersing agent such as oleyl alcohol. Suitable means to employ the aerosol inhalation therapy technique are described fully in U.S. 2,868,691 and 3,095,355.

In the preliminary evaluation of the bronchodilating effectiveness of $PGE_2$ prepared according to this invention, and as a proof of its valuable activity, intravenous administration of 4–8 mcg./kg. of 7-[3-hydroxy-2-(3-hydroxy-1-octenyl)-5-oxocyclopentyl]-5 - heptenoic acid to anesthetized guinea pigs was effective in preventing bronchoconstriction due to the intravenous administration of histamine 3 mcg./kg., acetylcholine 5–20 mcg./kg., serotonin 3 mcg./kg. and bradykinin 2–32 mcg./kg. It is noteworthy that the average duration of activity in this test, using 25 percent inhibition as the endpoint, was 3–5 minutes, and that the intravenous administration of 4 mcg./kg. of the medicament caused a mean blood pressure drop of only 12 mm. Hg of less than a minute duration. This test was used because results of this method are often substantially similar to results obtained with other highly effective bronchodilating agents.

In a second test, the bronchodilator activity of the instant $PGE_2$ medicament was measured by exposing guinea pigs to an aerosol of the drug at various concentrations and time intervals. The animals were then challenged with histamine aerosol, and the protection from respiratory difficulties were measured.

In carrying out this test a number of animals, in replicates, are exposed to the drug aerosol spray in chamber A for a 2-minute period and remain exposed to the aerosol particles for 1 minute after cessation of spraying (3 minute total exposure to drug). The animal is then immediately transferred to chamber B previously sprayed with histamine for a 1-minute period, and the time necessary for onset of respiratory difficulty (T) is noted. The pigs previously had been evaluated to determine their mean convulsion times (C) to obtain control values, by exposing them to the mist and measuring the time required until each begins to convulse. An animal that can withstand 3 times its morning preconvulsion time is considered completely protected. Individual control (C) and post drug preconvulsion times (T) are recorded and an activity value calculated by the formula $(T/C)$. A mean $(T/C)$ value greater than 1.2 indicates activity. This test is based on a technique described by Siegmund et al., J. Pharmacol. 90, 254 (1947) and 97, 14 (1949) and its clinical correlation is excellent.

The results of the tests are in Table I.

TABLE I.—EFFECT OF INTRAVENOUS 7-[3-HYDROXY-2-(3-HYDROXY-1-OCTENYL)-5-OXOCYCLOPENTYL]-5-HEPTENOIC ACID ON BRONCHOCONSTRICTION IN ANESTHETIZED GUINEA PIG

| Percent spray concentration | Number of pigs | No. of pigs completely protected | Mean T/C score |
|---|---|---|---|
| 0%–0.06 M PO₄ buffer, control | 6 | 0/6 | 0.92 |
| 0.0001 | 10 | 1/10 | 1.59 |
| 0.0005 | 10 | 2/10 | 2.19 |
| 0.001 | 10 | 8/10 | 2.78 |
| 0.005 | 10 | 4/10 | 2.40 |
| 0.01 | 10 | 5/10 | 2.34 |
| 0.05 | 10 | 9/10 | 2.89 |
| 0.1 | 15 | 12/15 | 2.79 |
| 0.2 | 10 | 9/10 | 2.99 |

Since a score of 1.5 or greater indicates activity and an animal that can withstand three times its control preconvulsion time is considered completely protected, the bronchodilating effectiveness of the instant compounds is readily apparent.

In Table II is shown the lack of toxicity noted with concentrated aerosols of the instant medicament. Pigs were actively sprayed with drug for 2 minutes and then left in the chamber for an additional three minutes thus exposing them to more drug for longer periods of time than was necessary in the histamine study.

TABLE II.—EFFECT OF AEROSOLIZED MEDICAMENT ON NORMAL PIGS

| Percent spray concentration | No. Pigs | Effects |
|---|---|---|
| 0.05 | 5 | No changes noted. |
| 0.1 | 6 | Do. |
| 0.2 | 5 | 1/5 pigs had slow respiration and tilted head to one side. |

The results of these experiments show that the $PGE_2$ compositions are potent, short acting bronchial smooth muscle dilators in guinea pigs by the intravenous and aerosol routes.

DESCRIPTION OF THE PREFERRED EMBODIMENTS

The following examples are given simply to illustrate this invention, but not in any way to limit its scope.

Example 1

Frozen sheep seminal vesicular glands are thawed then trimmed to remove excess fat and extraneous tissue. Two hundred and fifty grams of minced tissue and 50 g. of glass beads are added to a 3 liter high speed blender containing 500 ml. of 0.1 M ammonium chloride solution, pH 8.5, to which has been added 1 g. of glutathione. The mixture is homogenized at high speed for 5 minutes at 4° C. The resulting suspension is centrifuged at 4000 r.p.m. for 10 minutes at 4° C. and the supernatant is separated. The residue is extracted with 70 ml. of 0.1 M ammonium chloride, and the supernatants pooled then adjusted to pH 8. Arachidonic acid, 250 mg., is suspended in 500 ml. of 0.1 M ammonium chloride buffer, pH 8.5, containing 1 g. of glutathione and the suspension is adjusted to pH 8.5. The enzyme extract, 470 ml. and 500 ml. of the substrate suspension are combined and incubated for 1 hour at 37° C. with continuous stirring and sparging with compressed air. After incubation, the mixture comprising an aqueous solution of prostaglandin and impurities is frozen and dried in the frozen state under vacuum. The lyophilized powder, 24 g., is reconstituted to 200 ml. with water and adjusted to pH 7.5. The prostaglandin in the reconstituted solution is purified by dialysis through a cellulose membrane into 4 liters of distilled water at 10° C. for 18 hours. The dialysis is repeated with 3 l. of distilled water. The combined dialyzates are adjusted to pH 3 with dilute sulfuric acid and extracted with three 100 ml. portions of ether. The ether is assayed for total solids and for prostaglandin $PGE_2$. $PGE_2$ is measured by determination of a UV absorbing chromaphore at 282 m$\mu$ which develops in 50% ethanol (which is .5 M in sodium hydroxide) after 15 minutes at room temperature. The analysis indicates the presence of 138.6 mg. of 7-[3-hydroxy-2(3-hydroxy-1-octenyl)-5 - oxocyclopentyl]-5-heptenoic acid, $PGE_2$, yield 47.5%. The purified prostaglandin is obtained as a residue after distilling off the ether in vacuum.

Example 2

The procedure of Example 1 is repeated using pure oxygen instead of air for sparging the enzyme mixture during biosynthesis. There is obtained 129.2 mg. of $PGE_2$, 44% yield, substantially free from impurities.

Example 3

An extract of sheep seminal vesicular glands prepared according to the procedure of Example 1 is lyophilized. Twenty-five grams of the enzyme powder reconstituted with 625 ml. of cold distilled water is adjusted to pH 8 with dilute ammonium hydroxide. Two hundred and fifty milligrams of arachidonic acid and 1 g. of glutathione are added to 250 ml. of 0.1 M ammonium chloride solution, pH 8.5, and the pH is adjusted to 8.0. The enzyme and substrate are combined and incubated for 1 hour at 37° C., then the mixture is lyophilized and the crude prostaglandin residue is reconstituted in 200 ml. of water, and dialyzed against 6 liters of distilled water for 48 hours. The dialyzate is acidified to pH 3 and extracted once with 250 ml. of methylene chloride and three times with 250 ml. of ethylene dichloride. The combined extracts are shaken three times with 40 ml. of .2 M phosphate buffer, pH 8.0. The aqueous extract is acidified to pH 3 and extracted three times with 30 ml. of methylene chloride. Evaporation of the solvent provides 62.8 mg. of $PGE_2$ of 98% purity; yield, 21.5%.

Example 4

Eicosa-5,8,11,14,17-pentaenoic acid is converted to 7-[3 - hydroxy - 2-(3-hydroxy-1,5-octadienyl)-5-oxocyclopentyl]-5-heptenoic acid (prostaglandin $E_3$, $PGE_3$) and purified by the procedure of Example 1. Substantially the same results are obtained.

Example 5

Homo-γ-linolenic acid is converted to 7-[3-hydroxy-2-(3-hydroxy-1-octenyl)-5-oxocyclopentyl] - heptanoic acid (prostaglandin $E_1$, $PGE_1$) and purified by the procedure of Example 1. Substantially the same results are obtained.

Example 6

The procedure of Example 1 is used to purify crude aqueous suspensions of the following prostaglandins and derivatives rendering them suitable for therapeutic use:

7-[3α,5β-dihydroxy-2-(3-hydroxy-1-octenyl)-cyclopentyl]-heptanoic acid;

7-[3α,5β-dihydroxy-2-(3-hydroxy-1-octenyl)-cyclopentyl]-5-heptenoic acid;

7-[3α,5β-dihydroxy-2-(3-hydroxy-1,5-octadienyl)-cyclopentyl]5-heptenoic acid;

7-[3α,5β-dihydroxy-2-(3-hydroxyoctyl)-cyclopentyl]-heptanoic acid;

Methyl 7-[3α,5β-dihydroxy-2-(3-hydoxy-1-octenyl)-cyclopentyl]-heptanoate;

Methyl 7-[3α,5β-dihydroxy-2-(3-hydroxy-1-octenyl)-cyclopentyl]-5-heptenoate;

Methyl 7-[3α,5β-dihydroxy-2-(3-hydroxy-1,5-octadienyl)-cyclopentyl]-5-heptenoate;

Methyl 7-[3α,5β-dihydroxy-2-(3-hydroxyoctyl)-cyclopentyl]-heptenoate;

Methyl 7-[3α-hydroxy-2-(3-hydroxy-1-octenyl)-5-oxocyclopentyl]-5-heptenoic acid; and Methyl 7-[3α-hydroxy-2-(3-hydroxy-1,5-octadienyl)-5-oxocyclopentyl]-5-heptenoic acid.

We claim:

1. A process for purifying a crude biologically-active prostaglandin to separate it from impurities selected from antigens, progens, lipids, foreign proteins or cell debris comprising the steps of
    (a) dialyzing an aqueous solution containing said prostaglandin and said impurities whereby the prostaglandin substantially free of impurities passes through a semi-permeable membrane into water;
    (b) adding an acid to the solution of prostaglandin in water to adjust said solution to a pH of from about 1 to about 3.5;
    (c) separating the prostaglandin from the said solution by extraction into a lipid-solubilizing, substantially water immiscible inert organic solvent; and
    (d) separating the said solvent by evaporation, leaving the prostaglandin as a residue substantially free of said impurities.

2. A process as defined in claim 1 wherein the pH in step (b) is adjusted to about 3.

3. A process as defined in claim 1 wherein the prostaglandin is 7 - [3-hydroxy-2-3-hydroxy-1-octenyl)-5-oxocyclopentyl]-5-heptenoic acid.

4. A process as defined in claim 1 wherein the prostaglandin is 7 - [3-hydroxy-2-(3-hydroxy-1,5-octadienyl)-5-oxocyclopentyl]-5-heptenoic acid.

5. A process as defined in claim 1 wherein the prostaglandin is 7 - [3-hydroxy-2-(3-hydroxy-1-octenyl)-5-oxocyclopentyl]-heptanoic acid.

6. A process as defined in claim 1 wherein the aqueous solution in step (a) is a mixture prepared by incubating a fatty acid selected from arachidonic acid, eicosa-5,8,11,14,17-pentaenoic acid or homo-γ-linolenic acid and a prostaglandin-biosynthesizing enzyme until biosynthesis of said prostaglandin is substantially complete.

7. A process as defined in claim 6 wherein said enzyme is extracted from homogenized sheep seminal vesicular glands.

8. A process as defined in claim 6 wherein said incubation is carried out in a mixture which contains about 4 parts by weight of glutathione per part by weight of said fatty acid.

9. A process as defined in claim 6 wherein said organic solvent is ethyl ether.

10. A process as defined in claim 6 wherein said organic solvent is methylene chloride.

11. [A process as defined in claim 6 wherein said fatty acid is arachidonic acid and said prostaglandin is 7-[3-hydroxy - 2 - (3-hydroxy-1-octenyl)-5-oxocyclopentyl]-5-heptenoic acid.

12. A process as defined in claim 6 wherein said fatty acid is eicosa-5,8-11,14,17-pentaenoic acid and said prostaglandin is 7-[3-hydroxy-2-(3-hydroxy-1,5-octadienyl)-5-oxocyclopentyl]-5-heptenoic acid.

13. A process as defined in claim 6 wherein said fatty acid is homo-γ-linolenic acid and said prostaglandin is 7 - [3 - hydroxy - 2-(3-hydroxy-1-octenyl)-5-oxocyclopentyl]-heptanoic acid.

References Cited

UNITED STATES PATENTS 3,296,091    1/1967    Beal et al. _____ 167—74 X

OTHER REFERENCES

Berg: Physical and Chemical Methods of Separation, pp. 238–241 (1963).

LORRAINE A. WEINBERGER, Primary Examiner

P. J. KILLOS, Assistant Examiner

U.S. Cl. X.R.

195—30; 260—999

PO-1050
(5/69)

UNITED STATES PATENT OFFICE
CERTIFICATE OF CORRECTION

Patent No. 3,504,019     Dated March 31, 1970

Inventor(s) Milton Lapidus, Norman H. Grant, Harvey E. Alburn

It is certified that error appears in the above-identified patent and that said Letters Patent are hereby corrected as shown below:

In column 2, line 63, the word "In" should read -- It --.

In claim 3, line 4, a parenthesis should be inserted between the 2-3 so that the compound reads -- [3-hydroxy-2-(3-hydroxy-1-octenyl)-... --.

In claim 11, line 29, the extraneous bracket ([) should be omitted.

SIGNED AND
SEALED
SEP 8 - 1970

(SEAL)
Attest:

Edward M. Fletcher, Jr.
Attesting Officer

WILLIAM E. SCHUYLER, JR.
Commissioner of Patents